US012077994B2

(12) United States Patent
Obita et al.

(10) Patent No.: US 12,077,994 B2
(45) Date of Patent: Sep. 3, 2024

(54) HOOD LATCH CRASH OPENING PREVENTION

(71) Applicant: Volvo Car Corporation, Gothenburg (SE)

(72) Inventors: Bishop Otim Obita, Gothenburg (SE); Christer Dominique, Torslanda (SE); Monika Majewska, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/835,179

(22) Filed: Jun. 8, 2022

(65) Prior Publication Data

US 2022/0298831 A1 Sep. 22, 2022

Related U.S. Application Data

(62) Division of application No. 16/140,640, filed on Sep. 25, 2018, now Pat. No. 11,384,571.

(30) Foreign Application Priority Data

Oct. 3, 2017 (EP) .................................... 17194495

(51) Int. Cl.
*E05B 77/06* (2014.01)
*E05B 77/38* (2014.01)
(Continued)

(52) U.S. Cl.
CPC .............. *E05B 77/06* (2013.01); *E05B 77/38* (2013.01); *E05B 77/42* (2013.01); *E05B 83/24* (2013.01); *E05B 83/243* (2013.01); *E05B 85/26* (2013.01)

(58) Field of Classification Search
CPC .......... E05B 77/02; E05B 77/04; E05B 77/06; Y10S 292/22
See application file for complete search history.

(56) References Cited

U.S. PATENT DOCUMENTS 3,580,624 A * 5/1971 Gmeiner ................. E05B 85/24 292/216
3,583,741 A * 6/1971 Breitschwerdt ......... E05B 77/06 292/216
(Continued)

FOREIGN PATENT DOCUMENTS

CN 1946913 A 4/2007
CN 202220498 U 5/2012
(Continued)

OTHER PUBLICATIONS

Computer Generated Translation for DE 10114966, Generated on Feb. 7, 2023, https://worldwide.espacenet.com/ (Year: 2023).*
(Continued)

*Primary Examiner* — Alyson M Merlino
(74) *Attorney, Agent, or Firm* — Clements Bernard Walker; Christopher L. Bernard

(57) ABSTRACT

The present invention relates to a hood latch system for a vehicle comprising a hood having a striker, the system comprises: a spring loaded claw rotatable between an engaged position in which the striker is locked in place by the claw, and an open position in which the striker is disengaged from the claw, and a main pawl rotatable between a first position in which the claw is held in place by the main pawl in the engaged position and a second position in which the claw is released by the main pawl whereby the claw is allowed to rotate into the open position. When the main pawl is caused to be activated for rotating from the first position to the second position by a crash acceleration force, the main pawl is configured to prevent the striker from being released.

2 Claims, 8 Drawing Sheets

(51) Int. Cl.

| | |
|---|---|
| ***E05B 77/42*** | (2014.01) |
| ***E05B 83/24*** | (2014.01) |
| ***E05B 85/26*** | (2014.01) |

(56) References Cited

U.S. PATENT DOCUMENTS

| | | | | | |
|---|---|---|---|---|---|
| 3,799,596 | A * | 3/1974 | Nozomu | E05B 77/06 292/216 |
| 4,875,724 | A | 10/1989 | Gruber | |
| 4,917,417 | A | 4/1990 | Aubry | |
| 5,865,481 | A * | 2/1999 | Buschmann | E05B 77/06 292/216 |
| 6,695,360 | B1 | 2/2004 | Forsell et al. | |
| 7,802,345 | B2 | 9/2010 | Mathew et al. | |
| 9,027,971 | B2 | 5/2015 | Barczynski et al. | |
| 9,187,936 | B2 | 11/2015 | Kim et al. | |
| 10,273,728 | B2 * | 4/2019 | Nam | E05B 77/06 |
| 11,384,571 | B2 * | 7/2022 | Obita | E05B 77/04 |
| 2004/0032129 | A1 | 2/2004 | Gates et al. | |
| 2007/0271974 | A1 * | 11/2007 | Jankowski | E05B 77/06 70/237 |
| 2010/0237633 | A1 | 9/2010 | Jankowski et al. | |
| 2010/0320777 | A1 | 12/2010 | Jankowski et al. | |
| 2011/0109104 | A1 | 5/2011 | Hari | |
| 2014/0284939 | A1 | 9/2014 | Wittelsbuerger et al. | |
| 2015/0145263 | A1 | 5/2015 | Farris et al. | |
| 2015/0197966 | A1 | 7/2015 | Regnault et al. | |
| 2015/0240537 | A1 * | 8/2015 | Cumbo | E05B 77/06 292/200 |
| 2015/0308161 | A1 * | 10/2015 | Rosales | E05B 77/06 292/195 |
| 2016/0090758 | A1 | 3/2016 | Bendel | |
| 2016/0340941 | A1 | 11/2016 | Taurasi | |
| 2018/0155940 | A1 | 6/2018 | Nagaoka et al. | |

FOREIGN PATENT DOCUMENTS

| | | | | | |
|---|---|---|---|---|---|
| CN | 102844513 | A | | 12/2012 | |
| CN | 103348077 | A | | 10/2013 | |
| CN | 105814268 | A | | 7/2016 | |
| DE | 1678024 | B1 | * | 8/1971 | |
| DE | 3825593 | C | * | 11/1989 | E05B 85/26 |
| DE | 4117110 | C1 | * | 12/1992 | E05B 77/06 |
| DE | 19511651 | A1 | * | 10/1995 | E05B 77/06 |
| DE | 19738492 | A1 | * | 3/1998 | E05B 77/06 |
| DE | 10114965 | A1 | * | 10/2002 | E05B 77/06 |
| DE | 10114966 | A1 | * | 10/2002 | E05B 77/06 |
| DE | 10204422 | A1 | | 8/2003 | |
| DE | 10359737 | A1 | | 7/2005 | |
| DE | 202010010577 | U1 | * | 12/2011 | E05B 77/06 |
| EP | 2089599 | A1 | | 3/2010 | |
| EP | 2326781 | A1 | | 6/2011 | |
| EP | 2845972 | A3 | | 7/2016 | |
| FR | 2954386 | B | | 3/2012 | |
| GB | 2275727 | A | * | 9/1994 | E05B 77/06 |
| KR | 100380374 | B | | 4/2003 | |
| KR | 100418507 | B | | 5/2003 | |
| KR | 20170025659 | A | | 3/2017 | |
| KR | 20170043831 | A | | 4/2017 | |
| WO | WO-2012107023 | A2 | * | 8/2012 | E05B 77/06 |
| WO | 16138932 | A1 | | 9/2016 | |

OTHER PUBLICATIONS

Jun. 19, 2018 European Search Report issue on International Application No. EP17194495.

First office action/search report issued in the corresponding Chinese application No. 201811156078.7.

Please find enclosed an office action and search report issued in the corresponding CN application No. 202011589420.X.

* cited by examiner

HOOD LATCH CRASH OPENING PREVENTION

CROSS-REFERENCE TO RELATED APPLICATION

The present patent application/patent is a divisional (DIV) of co-pending U.S. patent application Ser. No. 16/140,640, filed on Sep. 25, 2018, and entitled "HOOD LATCH CRASH OPENING PREVENTION," which claims the benefit of priority of co-pending European Patent Application No. 17194495.2, filed on Oct. 3, 2017, and entitled "HOOD LATCH CRASH OPENING PREVENTION," the contents of both of which are incorporated in full by reference herein.

FIELD OF THE INVENTION

The present invention generally relates to a hood latch system for a vehicle comprising a hood having a striker.

BACKGROUND OF THE INVENTION

Safety in the automotive industry is of high importance both with respect to vehicle-pedestrian impacts and vehicle-vehicle impact. Most modern vehicles today have relatively advanced safety systems including airbags for protection of occupants of the vehicle, and external sensors on the vehicle to provide collision warnings or even automatic braking in case of a predicted collision.

Apart from electronic safety systems, the structure of the vehicle itself may also be particularly designed to behave in a predetermined way in case of an impact with a foreign object or a person. This applies for example to the hood of the vehicle.

The hood of a vehicle is generally intended to be held firmly in place when it is shut, but it should at the same time be possible to open the hood in a convenient way for a user. This also means that the hood may risk to spring open in case of an impact. The hood generally has a striker attached on the inside, and is arranged such that it falls in a slot in a hood latch arrangement. In the slot, a latch holds the striker in place such that the hood is shut. A pawl may be activated by a user to release the latch and thereby open the hood.

One example hood latch arrangement is disclosed in US2014/0015258 in which the fish mouth arranged to receive the striker is made extra long such that the hood falls deeper into the fish mouth upon impact with a pedestrian. Thereby, some springiness is provided in the hood to absorb the impact as the pedestrian lands on the hood. However, the hood may still become open as a result of the impact, for example in case of a collision which does not apply force downwards on the hood.

Accordingly there is a need for an improved hood latch arrangement with regards to the safety aspects.

SUMMARY OF THE INVENTION

In view of above, it is an object of the present invention to provide a hood latch arrangement which is configured to prevent the hood to unintentionally come open in the event of a vehicle crash. To prevent the opening of the hood during a crash is desirable since the hood may otherwise cause considerable damage to pedestrians, occupants of the vehicle or occupants of an impacting vehicle, or damage to the vehicles themselves.

According to a first aspect of the invention, there is provided a hood latch system for a vehicle comprising a hood having a striker attached to the inside of the hood, the hood latch system comprising: a spring loaded claw pivotally attached to an assembly base, the claw is rotatable between an engaged position in which the striker is locked in place by the claw, and an open position in which the striker is disengaged from the claw, a main pawl pivotally attached to the assembly base, wherein, under the influence of a normal operation force, the main pawl is rotatable between a first position in which the claw is held in place by the main pawl in the engaged position and a second position in which the claw is released by the main pawl whereby the claw is allowed to rotate into the open position, wherein, when the pawl is caused to be activated for rotating from the first position to the second position by a crash acceleration force caused by a crash event, the main pawl is configured to prevent the striker from being released from the hood latch system, wherein, the crash acceleration force is higher than the normal operation force.

The present invention is based on the realization that the high acceleration forces occurring during a crash event with a vehicle which may cause unintentional opening of the hood may be utilized for preventing the hood from opening during a crash. In the event of a collision with a vehicle, high forces are usually exerted on the vehicle. These forces may for example cause a deformation of the cable (e.g. Bowden cable) which is generally pulled by a user from the inside of the vehicle in order to unlock the hood. Such deformation may cause the hood latch to unintentionally spring open. Furthermore, high acceleration may also cause parts of a hood latch to move in an undesirable and unpredictable way which may also cause the hood to come open. However, the inventors realized to use at least one of these uncontrollable forces that may occur during a crash to automatically prevent the hood latch system to open the hood. It is further realized that a prevention of accidental opening of the hood is possible with mechanical parts only.

A hood latch system is generally arranged in the front parts of the vehicle and comprises a claw having a slot in which a striker of the hood may be received when the claw is in its open position. The striker may be U-shaped and arranged on the hood such that the striker falls into the slot of the claw when the claw is in its open position and the hood is being closed. As the claw is rotated to an engaged position, the slot of the claw is rotated such that the striker can no longer be released from the claw. In other words, the orientation of the claw becomes such that the slot is pointing away from the hood where the striker is attached to thereby hold the striker in place.

The claw may be spring loaded by a spring in such way that the spring forces acts to rotate the claw towards the open position. However, the claw is held in the engaged position by a pawl, whereby if the pawl releases the claw, the spring causes the claw to rotate to the open position such that the striker may be released.

A pawl cooperates with the claw to hold the striker in place or to release the striker. The pawl may have various shapes but has a function of releasing the claw to allow it to rotate from the engaged position to the open position. The pawl may have a claw holding portion adapted to engage with the claw to hold the claw in place in the engaged position when the pawl is in the first position. When the pawl is rotated from the first position to the second position, the claw holding portion moves in a direction to disengage from the claw, whereby the claw is released and may rotate to the open position.

The crash acceleration force is the force exerted on the hood latch system during crash with the vehicle. This acceleration force is higher than the normal operation force required for activating the pawl for opening the hood.

That the main pawl is configured to prevent the striker from being released from the hood latch system main be that the main pawl directly or indirectly prevents the striker from being released from the hood latch system. In other words the striker does not necessarily have to be in contact with the striker for preventing it to be released.

Accordingly, the invention provides the advantage of preventing the hood to open in case the hood latch arrangement is subjected to a high acceleration force caused by a crash impact.

According to an embodiment of the invention, the hood latch system according may comprise: an inertia pawl rotatable with respect to the main pawl between a blocking positon in which the inertia pawl blocks the main pawl from rotating from the first position to the second position, and an non-blocking position in which the main pawl is allowed to rotate from the first position to the second position, the inertia pawl is bias to be in the non-blocking position under normal operation, wherein under the influence of the crash acceleration force the inertia pawl is configured to rotate to the blocking position. The inertia pawl is particularly advantageous in cases with high acceleration when unintentional opening of the hood is desirable, i.e. during a crash. The high acceleration causes an acceleration force that overcomes the force required to rotate the inertia pawl. The inertia pawl has inertia which such that it is only at and above a specific acceleration (tailored for an implemented hood latch system) that the inertia pawl rotates with respect to the main pawl for blocking the main pawl from rotating from the first position to the second position.

In one embodiment of the invention, the inertia pawl may be spring loaded by a spring and is arranged to rotate in a plane generally perpendicular to the rotation plane of the main pawl, wherein the inertia pawl comprises a blocking portion configured to be held away from the rotation plane of the main pawl by the spring in the non-blocking position of the inertia pawl during normal operation, and wherein during the crash event under the influence of the crash acceleration force, the spring is configured to allow the inertia pawl to rotate such that the blocking portion intercepts the rotational plane of the main pawl whereby the main pawl is prevented by the blocking portion of the inertia pawl from moving into the second position to release the claw. Advantageously, the spring ensures that the inertia pawl is in a non-blocking position for the main pawl during normal operation. In the event of a high acceleration such as during a crash, the moment of inertia form the inertia pawl together with the acceleration of the hood latch system during the crash overcomes the spring force whereby the inertia pawl can move into the rotational plane of the main pawl to block it from rotating into the second position.

An inertia pawl is advantageously elongated in one direction for improved inertia properties.

The inertia pawl is further advantageously pivotally attached to the assembly base.

Advantageously, the main pawl may be spring loaded around its rotation axis and is biased by the spring towards the first position, wherein under the influence of the crash acceleration force during a crash event, the spring loaded inertia pawl is configured to move the blocking portion into the rotation plane of the main pawl before the main pawl has rotated into the second position to release the claw. Thus, the inertia pawl and its spring are adapted such that they ensure that the inertia pawl can rotate into the rotational plane of the main pawl before the main pawl has been able to rotate past the inertia pawl to its second position, at and above a given acceleration caused by a crash.

According to one embodiment, the inertia pawl may be pivotally attached at one end portion of the inertia pawl to the main pawl at a location of the pawl off-center from the rotation center of the pawl, wherein the inertia pawl is spring loaded at the pivotal attachment and bias towards in the same rotation direction as for rotating the main pawl from the first position to the second position, wherein when subject to a crash acceleration force which causes the inertia pawl to rotate from the first position towards the second position, the spring is adapted to allow the inertia pawl to rotate in a direction opposite to the opening rotation direction of the main pawl an wherein the off-center location of the inertia pawl with respect to the rotation center of the main pawl causes the inertia pawl to translate in a spatial direction such that a second end portion of the inertia pawl meets a blocking element that prevents a further spatial movement of the inertia pawl and thereby also prevents a further rotation of the main pawl before the main pawl has rotated into the second position to release the claw.

According to embodiments of the invention, the main pawl may be configured to release the claw under the influence of the crash acceleration force, and to subsequently prevent the striker from being released from the hood latch system. Accordingly, the pawl itself may be movable into a third position where it can prevent the striker from being released.

In one possible embodiment, the main pawl may comprise a claw holding portion and a striker holding portion, the striker holding portion is generally hook-shaped, the striker holding portion being an end portion of the main pawl, and the claw holding portion and the striker holding portion being on opposite sides of the rotation center of the pawl, wherein, under the influence of the crash acceleration force the main pawl is configured to rotate from the first position to a third position via the second position, wherein in the third position the striker holding portion prevent the striker from being released from the hood latch system. Accordingly, if a crash causes an exaggerated motion of the pawl, it may rotate past its second position and into a third position where the pawl itself locks the striker in place. Such an exaggerated motion may for example be caused by a deformation on a Bowden cable connected to the pawl. The Bowden cable is normally used for unlocking the hood from the claw from inside the vehicle by pulling on the cable which causes a rotation of the pawl from the first position to the second position.

According to yet another embodiment, the hood latch system may comprise a spring loaded pawl activating lever pivotally attached to the assembly base with the same rotation center as the main pawl, wherein at the normal operation force, the a spring loaded pawl activating lever is configured to rotate with a speed such as to latch onto the main pawl for rotating the main pawl from the first position into the second position, wherein at the crash acceleration force, the a spring loaded pawl activating lever is configured to rotate with a speed causing the pawl activating lever to rotate without latching onto the main pawl such that the main pawl is maintained in the first position.

Accordingly, depending on the rotational speed of the pawl activating lever, the pawl activating lever may latch on to the main pawl in order to cause a rotation of the main pawl from the first position to the second position. The pawl activating lever is biased to latch on to the main pawl, however, if the pawl activating lever is rotated too fast, it rotates past a latch-on position of the main pawl so that the pawl activating lever does not latch on to the main pawl. Consequently, the main pawl is maintained in its first position in which the claw is held in its engaged position holding on to the striker.

In one possible embodiment, the pawl activating lever comprises a protrusion facing the main pawl, and the main pawl comprises an opening into which the protrusion is adapted to fit, wherein the pawl activating lever is further spring loaded such that the protrusion is pushed towards the main pawl, wherein at the normal operation force, and the pawl activating lever is rotated about the rotation center, the protrusion is arranged to coincide with the opening in the main pawl whereby the protrusion is pushed into the opening such that the pawl activating lever causes the pawl to move from the first position to the second position. Accordingly at the crash acceleration force, the rotation of the pawl activating lever is too fast for the protrusion to be pushed into the opening whereby the pawl is maintained in the first position. The pawl activating lever may further be spring loaded such as to be biased in a direction opposite to the rotation direction for rotating the main pawl from the first position to the second position.

According to a second aspect of the invention, there is provided a vehicle comprising the hood latch system according to any one of the above-mentioned embodiments.

This second aspect of the invention provides similar advantages as discussed above in relation to the previous aspect of the invention.

In summary, the present invention relates to a hood latch system for a vehicle comprising a hood having a striker, the systems comprises: a spring loaded claw rotatable between an engaged position in which the striker is locked in place by the claw, and an open position in which the striker is disengaged from the claw, a main pawl rotatable between a first position in which the claw is held in place by the main pawl in the engaged position and a second position in which the claw is released by the main pawl whereby the claw is allowed to rotate into the open position. When the main pawl is caused to be activated for rotating from the first position to the second position by a crash acceleration force, the main pawl is configured to prevent the striker from being released.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

Figure 1:
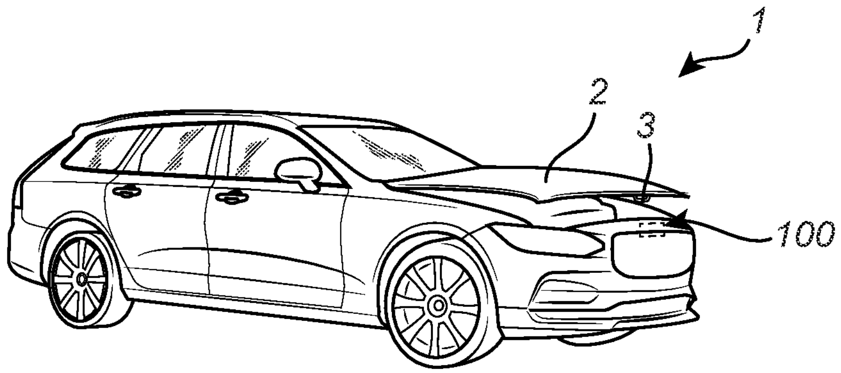
FIG. 1 conceptually illustrates a vehicle comprising a hood latch system.

In the present detailed description, various embodiments of the system according to the present invention are mainly described with reference to a vehicle in the form of a car having a hood in the front of the car. However, the present invention may equally be used with other vehicles such as trucks, buses, etc., and having various locations for the hood not necessarily being in the front of the vehicle. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 illustrates a vehicle in the form a car 1 comprising a hood 2 and a hood latch system 100. The hood 2 comprise a striker 3 attached on the inside of the hood 2. The striker 3 is arranged such that it falls into a slot 4 (see e.g. FIG. 2*a*) in the hood latch system in which a claw 104 (see e.g. FIG. 2*a*) is arranged to lock the striker 3 in place in the slot 4 such that the hood 2 is held in a closed position. The striker 3 may be released from the inside of the vehicle by means of pulling a cable, e.g. a Bowden cable which causes the claw to release the striker. Various embodiments of a hood latch system will now be described in detail with reference to FIGS. 2*a*-5*c*.

Figure 2A:
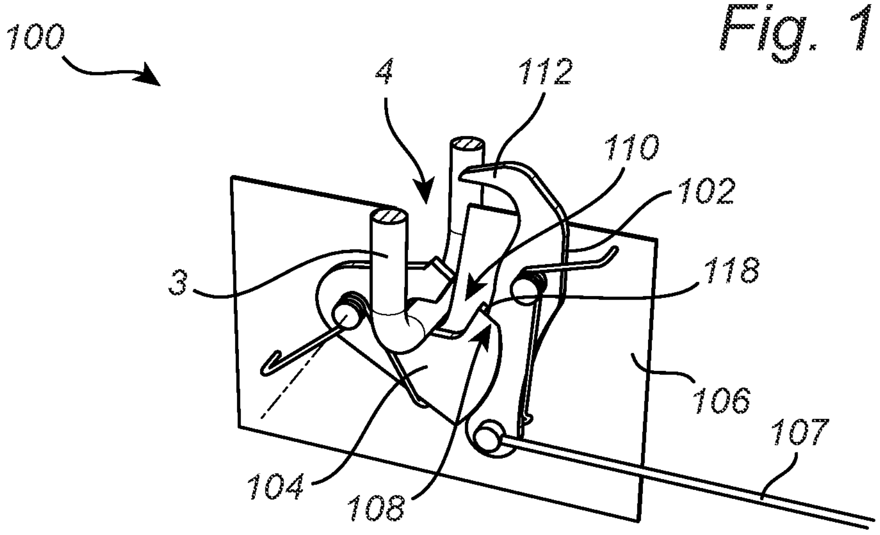
FIG. 2*a*-*d* conceptually illustrate a hood latch system according to embodiments of the invention.

FIGS. 2*a*-*d* conceptually illustrates one embodiment of a hood latch system 100. In FIG. 2*a*, the hood latch system is shown with the claw 104 in an engaged position in which the striker 3 is locked in place by the claw 104. The claw 104 is held in its engaged position by a main pawl 102. Both the spring loaded claw 104 and the main pawl 102 are pivotally attached to an assembly base 106 such that they may rotate about a respective rotation axis 114 and 116 (see FIG. 2*b*). The claw 104 comprises a slot 110 in which the striker is adapted to fit and be held in place when the claw 104 is in this engaged position. The slot is oriented at least partly sideways when the claw 104 is in the engaged position (FIG. 2*a*) such that the striker 3 cannot be released upwards out from the slot 110.

The claw 104 is spring loaded and biased towards the open position, in other words, if the pawl 102 releases the claw 104, the claw 104 will rotate under the influence of the spring force from the engaged position (FIG. 2*a*), to the open position (FIG. 2*c*), counter-clockwise as seen in the perspective shown in FIGS. 2*a*-*d*.

Starting from FIG. 2*a*, the main pawl 102 is in a first position in which the claw 104 is held in its engaged position locking the striker 3 in place such that the hood is held closed. The main pawl 102 comprises a claw holding portion in the form of a holding shoulder 108 adapted to mechanically make contact with a contact surface 118 of the claw 104. The holding shoulder 108 faces the contact surface 118 in a direction at least partly opposite a tangent of the rotation direction of the claw 104 for rotating from the engaged position to the open position. Consequently, the contact between the holding shoulder 108 of the pawl 102 and the contact surface 118 of the claw 104 prevent the claw 104 from rotating from the engaged position to the open position under the influence of the spring force acting on the claw 104.

Figure 2B:
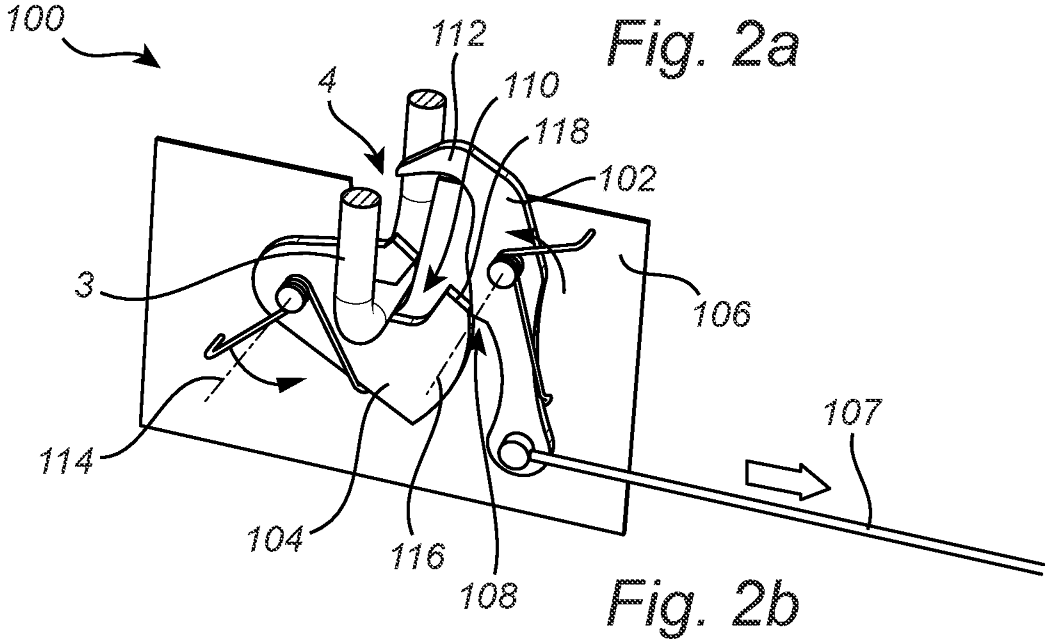

In FIG. 2*b*, the main pawl 102 has been rotated about its rotation axis 116 by a force acting on the Bowden cable 107. The main pawl 102 is caused to rotate in counter-clockwise direction. The rotation of the main pawl 102 moves the holding shoulder 108 sideways whereby the contact surface 118 of the claw 104 is exposed. The main pawl 102 is now in its second position in which the claw 104 is free to rotate under the influence of the spring force, from the engaged position (FIGS. 2*a-b*) to its open position illustrated in FIG. 2*c*.

Figure 2C:
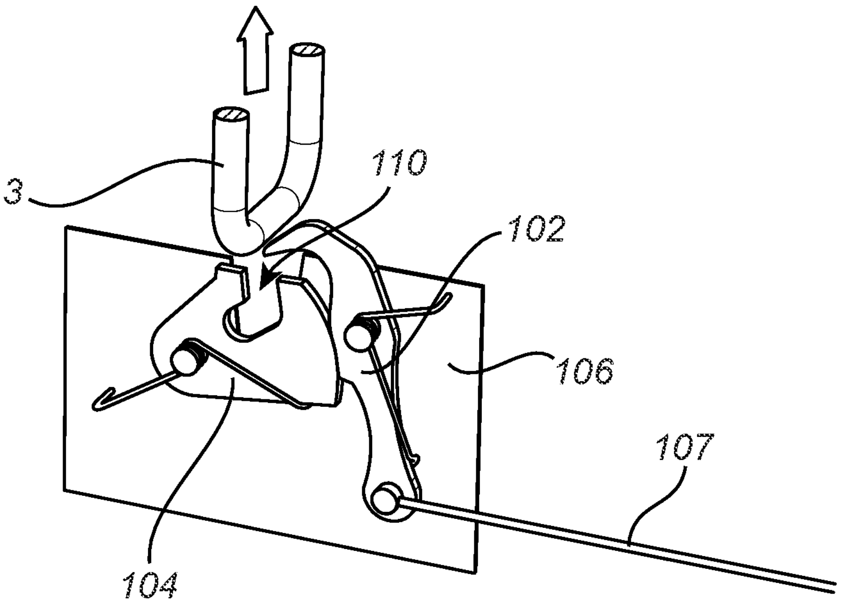
Figure 2D:
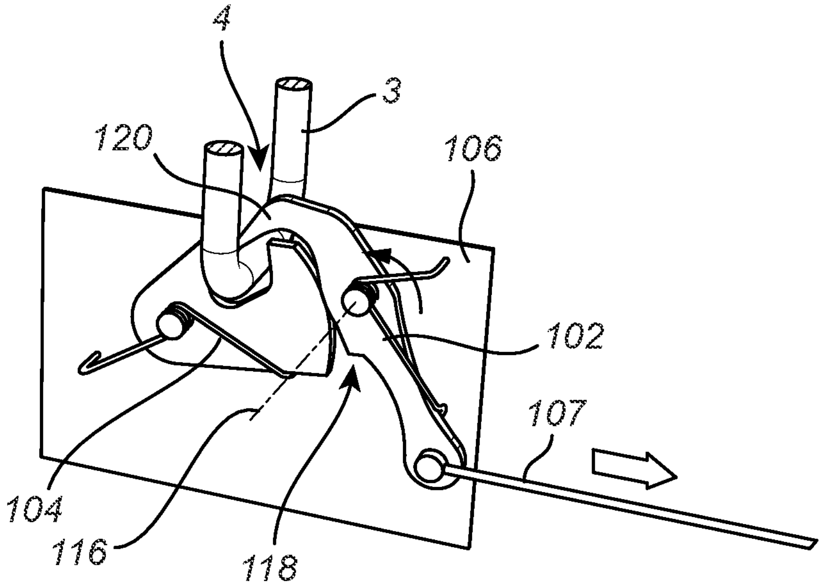

In FIG. 2*c*, the striker 3 is shown released from the claw 104 and moving upwards. This represents the hood 2 being opened under a normal operation force pulling on the cable 107. In other words, the main pawl 102 rotates from the first position to the second position whereby the claw 104 rotates from the engaged position to the open position to release the striker 3.

In case of an accident a rapid deformation of the Bowden cable 107 may be caused. In such case the main pawl 102 may unintentionally be caused to rotate from its first position to the second position. The force acting on the cable 107 are generally applied rapidly, causing a fast rotation of the main pawl 102 about its rotation axis 116. As is conceptually illustrated in FIG. 2*d*, the main pawl 102 is configured to, subsequent to having been in its second position (FIG. 2*c*) in which the claw 104 is released, configured to prevent the striker 3 from being released from the hood latch system 100.

In this exemplary embodiment, the main pawl 102 comprises the holding shoulder 108 and a striker holding portion 120 on opposite sides of the rotation axis 116, i.e. the initial movement of the holding shoulder 108 when the main pawl 102 rotates counter-clockwise is away from the claw 104, whereas the striker holding portion 120 moves towards the opening slot 4 where the striker is held in place by the claw 104. The striker holding portion 120 is hook-shaped and arranged at the end portion of the pawl 102 nearest to the striker 3. The main pawl 102 may rotate past its second position (FIG. 2*c*) and to a third position illustrated in FIG. 2*d*. In the event of a crash of certain magnitude causing a rapid deformation of the cable 107, and the rotation of the main pawl 102 is sufficiently fast, the main pawl 102 rotates into the third position faster than the striker 3 can be released from the slot 4 whereby the hook-shaped striker holding portion 120 prevents the striker from being released from the hood latch system 100.

Figure 3A:
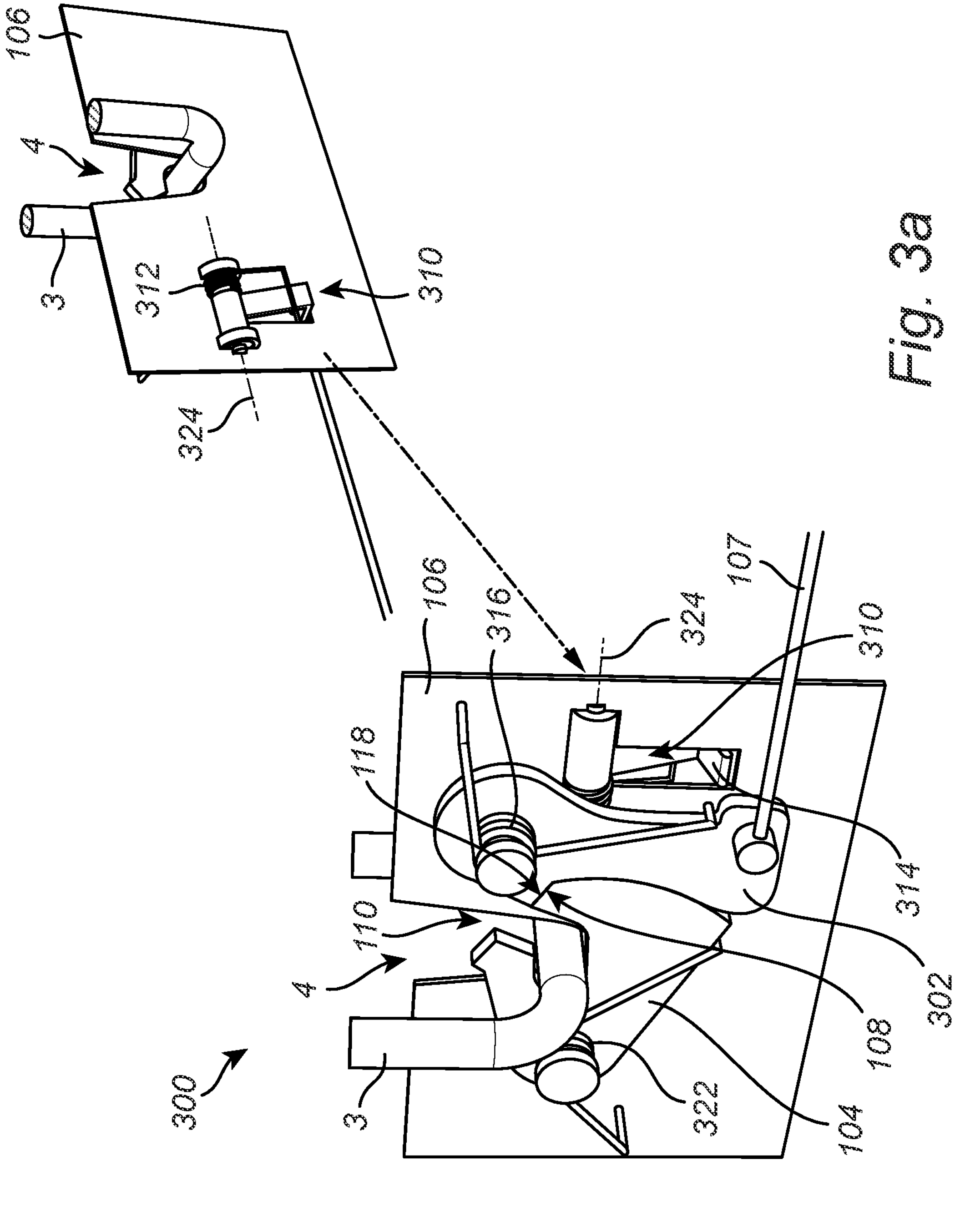
FIG. 3*a*-*b* conceptually illustrate another hood latch system according to embodiments of the invention.
Figure 3B:
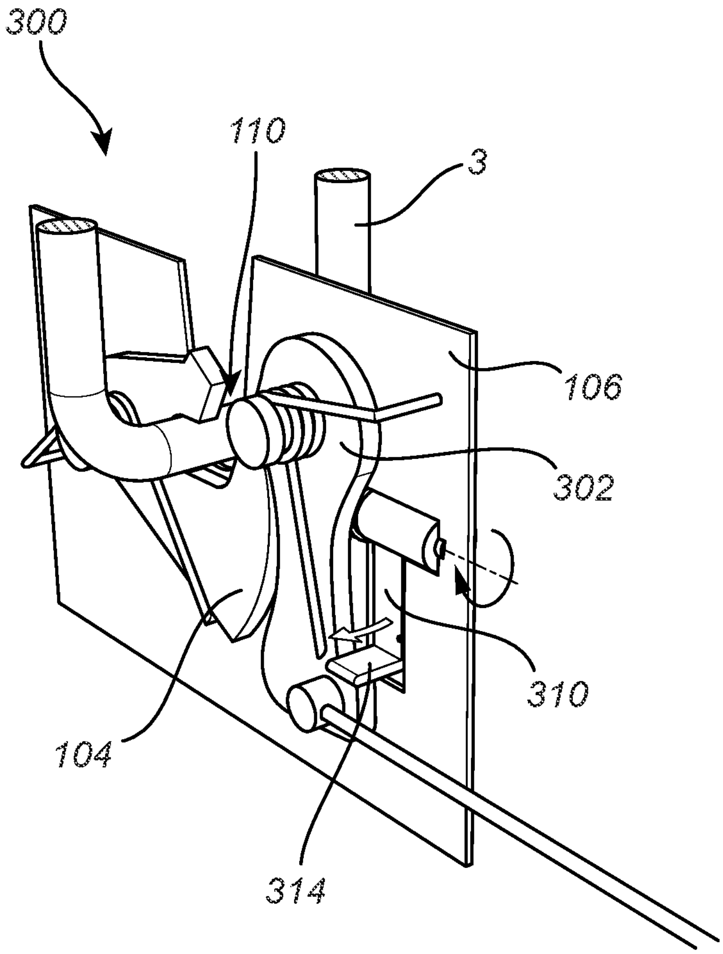

FIGS. 3*a-b* conceptually illustrate another embodiment of a hood latch system 300. Similar to the above-mentioned embodiment, the hood latch system in FIGS. 3*a-b* comprises a main pawl 302 pivotally attached to an assembly base 106, and a claw 104 also pivotally attached to the assembly base 106.

In FIG. 3*a*, the main pawl 302 is in its first position in which the claw holding portion 108 is in contact with the contact surface 118 of the claw 104, thereby preventing the claw 104 from rotating from the shown engaged position in which the striker 3 is held in place in the slot 110 of the claw 104, to the open position in which the striker 3 is released. If the main pawl 302 is rotated to its second position by e.g. pulling on the cable 107, the claw holding portion 108 loses contact with the contact surface 108 of the claw 104 whereby the claw 104 is released by the main pawl 302. Consequently, the claw 104 is rotated under the influence of a spring force from the spring 322 such that the slot 110 becomes oriented upwards whereby the striker 3 is released. The main pawl 302 is spring loaded by a spring 316 which is biased to caused a rotation from the second position to the illustrated first position, i.e. the spring force acts to rotate the main pawl from the second position to the first position.

There is further illustrated an exemplary inertia pawl 310 in FIG. 3*a-b*. Turning first to FIG. 3*a*, the inertia pawl 310 is shown in a non-blocking position in which the inertia pawl 310 does not block the main pawl 302 from rotating. The inertia pawl 310 is spring loaded by a spring 312 to be in this non-blocking position. Further, the inertia pawl 310 is rotatable with respect to the main pawl 302 about a rotation axis 324. Under the influence of a crash acceleration force in a direction towards the plane of the assembly base, in which plane the rotation axis 324 for the inertia pawl 310 lies, the moment of inertia for the inertia pawl together with the crash acceleration force overcomes the spring force of the spring 312. Thereby, the inertia pawl 312 rotates in a direction opposite to the biasing direction of the spring 312 to a blocking position as shown in FIG. 3*b*. After the crash acceleration force has decreased to a sufficiently low level the spring force from the spring 312 forces the inertia pawl 310 back to the non-blocking position.

The inertia pawl 310 illustrated in FIGS. 3*a-b* is rotatable in a plane perpendicular to the rotation plane of the main pawl 302. The inertia pawl 310 is further arranged such that a blocking portion 314 intercepts the main pawl's 302 rotation in the rotational plane of the main pawl 302 when the inertia pawl is in the blocking position.

Accordingly, when the inertia pawl 310 is in the blocking position as illustrated in FIG. 3*b*, as caused by a crash acceleration force, then the main pawl 302 is prevented from rotating from the first position to the second position by the blocking portion 314 of the inertia pawl 310. Thereby, the claw 304 is prevented by the main pawl 302 to rotate from the engaged position to the open position to release the striker 3.

FIGS. 4*a-d* illustrate another possible embodiment of a hood latch system 400. Parts and components in FIG. 4*a-d* with reference numerals already described with reference to the above-mentioned drawings will not be explained in detail here.

The hood latch system 400 conceptually illustrated in FIGS. 4*a-d* comprises a spring loaded pawl activating lever 410 which is pivotally attached to the assembly base 106 with the same rotation axis 416 as the main pawl 402. The spring loaded pawl activating lever 410 may be rotated by e.g. a force applied by pulling on the cable 107 attached to the pawl activating lever 410 at an end portion of the pawl activating lever 410. The pawl activating lever 410 is configured to rotate in a way to latch onto the main pawl 402 during normal operation. When the pawl activating lever 410 has latched onto the main pawl 402, the main pawl is rotated by the pawl activating lever 410 from the first position to the second position. However when the pawl activating lever 410 is rotated fast, the pawl activating lever 410 does not latch onto the main pawl 402 which then maintains in its first position.

Figure 4A:
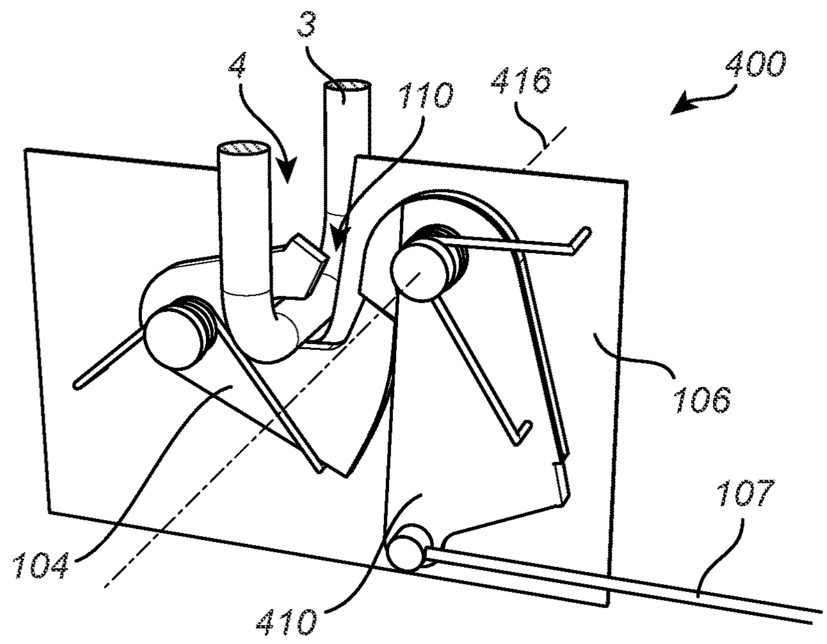
FIG. 4*a*-*d* conceptually illustrate yet another hood latch system according to embodiments of the invention.
Figure 4B:
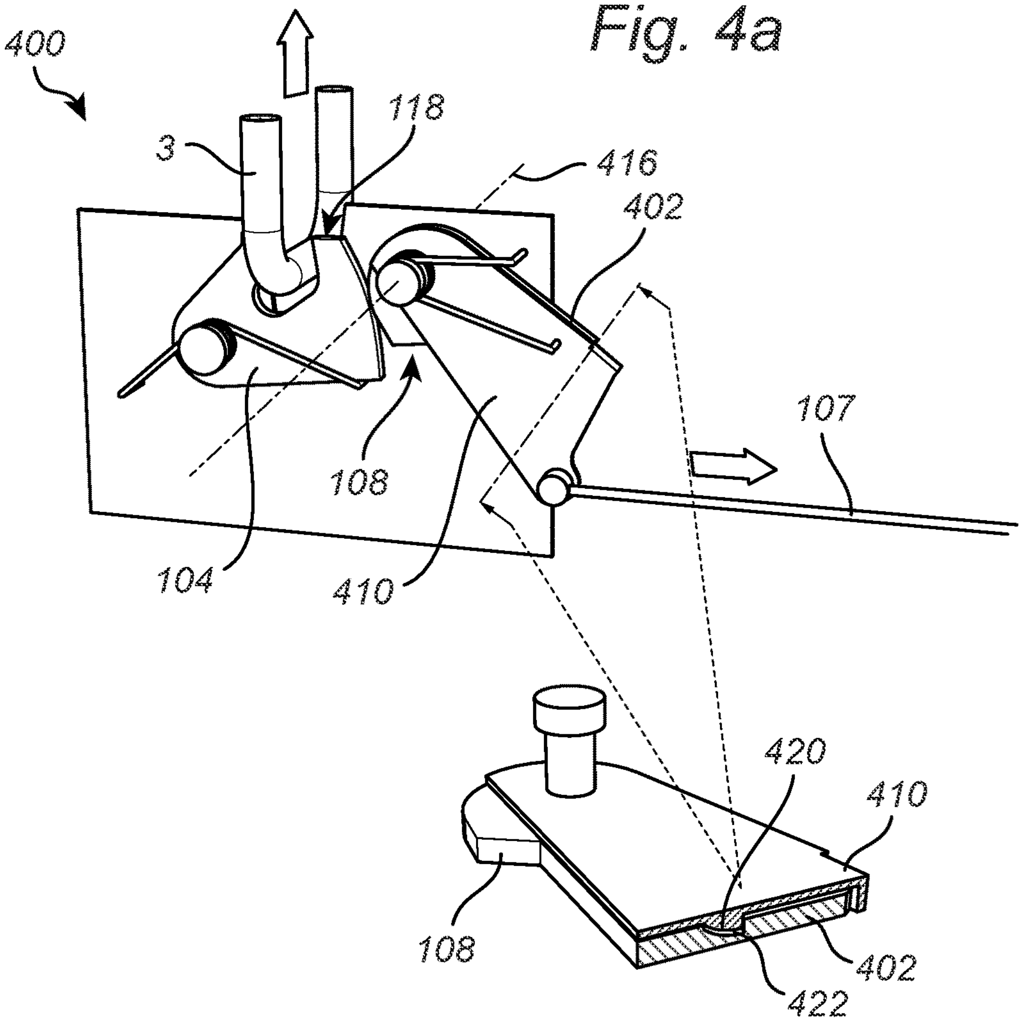
Figure 4C:
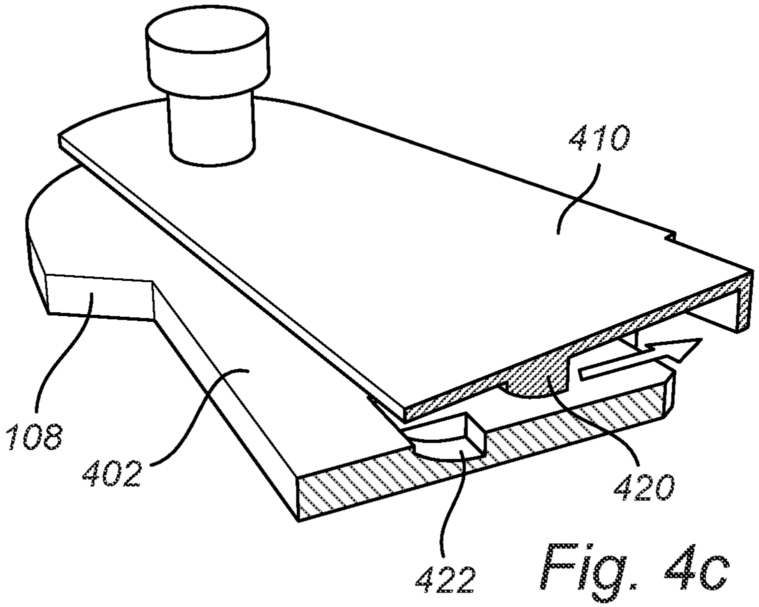

In the specific embodiment shown in FIGS. 4*a-c* the pawl activating lever 410 comprises a protrusion 420 which is adapted to fit into an opening 422 of the main pawl 402. During normal operating conditions, protrusion 420 of the pawl activating lever 410 falls into the opening 422 in the main pawl 402 when the pawl activating lever 410 is rotated about its rotation center 416 as is illustrated in FIG. 4*b*. The pawl activating lever 410 then causes the main pawl 402 to rotate form the first position to the second position whereby the claw 104 is rotatable from the engaged position to the open position such that the striker 3 can be released.

Figure 4D:
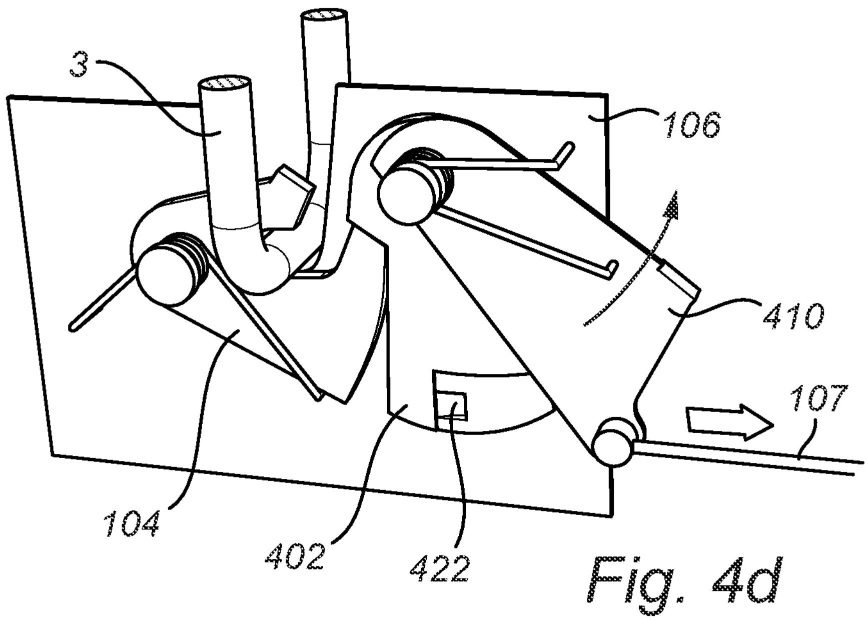

The pawl activated lever 410 is spring loaded to push towards the main pawl 402, thus the protrusion 420 falls into the opening 422 when the opening 422 and the protrusion 420 coincide. However, under the influence of a crash acceleration force acting in the direction of the tangent of the rotation of the pawl activated lever 410, i.e. in the direction of the force pulling on the cable 107, the rotation of the pawl activating lever may be too fast for the protrusion to be pushed into the opening whereby the main pawl is maintained in the first position, as illustrated in FIGS. 4*c-d*. In other words, the protrusion 420 of the pawl activated lever 410 rotates past the opening 422 without latching onto the opening whereby the main pawl 402 remains in the first position.

Figure 5A:
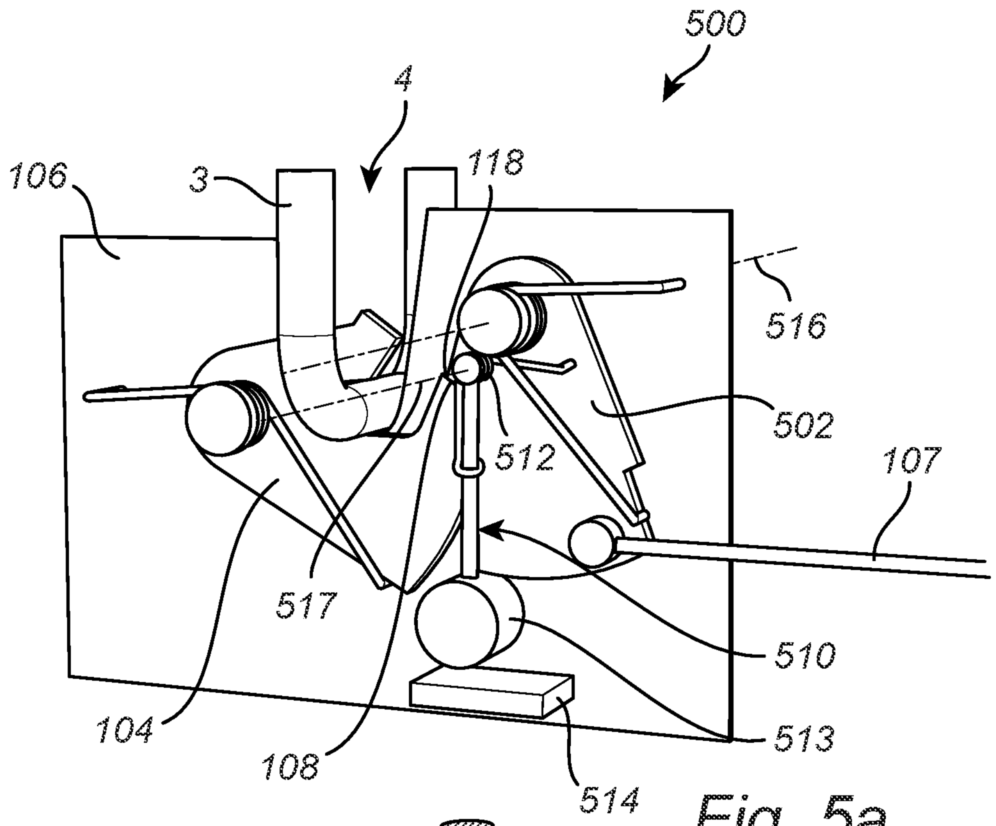
FIG. 5*a*-*c* conceptually illustrate a further hood latch system according to embodiments of the invention.
Figure 5B:
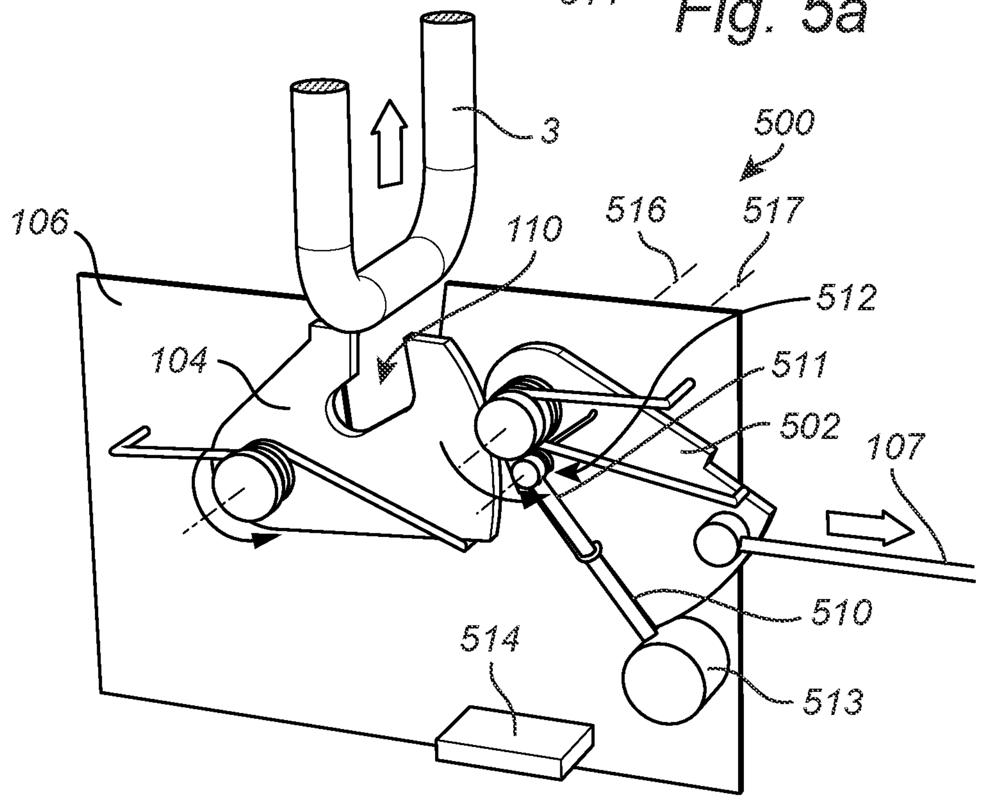

Now turning to FIGS. 5*a-b* illustrating a hood latch system 500 according to yet another embodiment of the invention. Parts and components in FIG. 5*a-b* with reference numerals already described with reference to the above-mentioned drawings will not be further explained in detail here. Refer instead to the previous drawings.

Figure 5C:
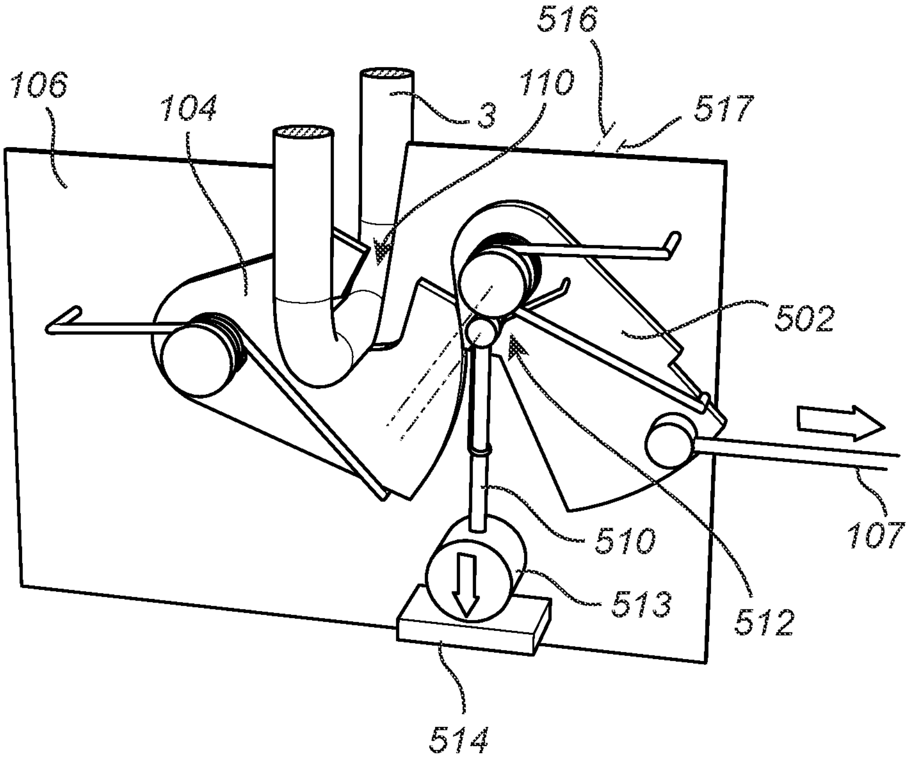

The hood latch system 500 shown in FIG. 5*a-c* comprises an inertia pawl 510 pivotally attached to the main pawl 502. The inertia pawl 510 is spring loaded by a spring 512, the spring is arranged to provide a spring force acting in the same rotational direction as for rotating the main pawl 502 from the first position to the second position, i.e. counter-clockwise as seen from the illustrated perspective. The inertia pawl 510 is rotatable about a rotation axis 517 which is off-center (i.e. not aligned with) from the rotation axis 516 of the main pawl 502. However, the rotation axes 516 and 517 are generally parallel.

Operation of the hood latch system under normal operating force conditions is illustrated in FIGS. 5*a-b*. In FIG. 5*a*, the main pawl 502 is in the first position in which the main pawl 502 blocks the claw 104 from rotating from the presently shown engaged position to the open position as described with reference to the above-mentioned drawings. When a normal operating force acts on the cable 107, the inertia pawl 510 follows the rotation of the main pawl 502 as is conceptually illustrated in FIG. 5*b*. In other words, the spring 512 is not compressed but instead forces the inertia pawl 510 to rotate with the main pawl 502. In FIG. 5*b*, the main pawl 502 is in the second position whereby the claw 104 has rotated into the open position and the striker 3 has been released.

FIG. 5*c* illustrate the hood latch system 500 under crash acceleration force conditions which has caused the main pawl 502 to initiate a rotation from the first position towards the second position. However, since the inertia pawl 510 is pivotally attached at an end portion 511 to the main pawl 502 at an off-center location with respect to the rotation axis 516 of the main pawl, the inertia pawl 510 will spatially move also downwards in this case (other direction may also be possible and tailored depending on the location of the blocking element 514). Furthermore, the inertia of the inertia pawl 510 and the spring force are configured such that the spring 512 will be compressed at a threshold acceleration tailored for the event of a crash, whereby the second end portion 513 of the inertia pawl 510 is translated downwards towards a blocking element 514 attached to the assembly base 106. When the second end portion 513 of the inertia pawl 510 meets the blocking portion 514, a further rotation of the main pawl is prevented. In particular, the length of the inertia pawl 510 between its end portions 511 and 513 matches the distance between the blocking element the first end portion 511 before the main pawl 502 has rotated enough to release the claw 104.

The main pawl, the claw, and inertia pawl according to the mentioned embodiments may be made from a rigid material such as a metal or a composite plastic- or carbon-based material.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A hood latch system for a vehicle comprising a hood having a striker attached to an inside of the hood, the hood latch system comprising:

a claw, spring loaded by a spring and pivotally attached to an assembly base, wherein the claw is rotatable between an engaged position, in which said striker is locked in place by said claw, and an open position, in which said striker is disengaged from said claw, a main pawl, spring loaded by another spring and pivotally attached to said assembly base, wherein, under the influence of a normal operation force, the main pawl is rotatable between a first position, in which the claw is held in place by said main pawl in the engaged position, and a second position, in which said claw is released by said main pawl, whereby said claw is allowed to rotate into said open position, and an inertia pawl, spring loaded by a further spring and rotatable with respect to the main pawl between a blocking position, in which the inertia pawl blocks the main pawl from rotating from said first position to said second position, and a non-blocking position, in which the main pawl is allowed to rotate from said first position to said second position, wherein, when said main pawl is caused to be activated for rotating from said first position to said second position by a crash acceleration force caused by a crash event, said main pawl is configured to prevent said striker from being released from the hood latch system, wherein said crash acceleration force is higher than said normal operation force, wherein the inertia pawl is biased to be in the non-blocking position under normal operation, wherein under the influence of said crash acceleration force the inertia pawl is configured to rotate to the blocking position, wherein said inertia pawl is pivotally attached at one end portion of the inertia pawl to said main pawl at a location off-center from a rotation center of the main pawl, wherein said inertia pawl is spring loaded by the further spring at the pivotal attachment and biased in the same rotation direction as for rotating the main pawl from the first position to the second position, wherein, when subject to the crash acceleration force which causes the main pawl to be activated to rotate from the first position to the second position, the further spring is adapted to allow the inertia pawl to rotate relative to the main pawl in a direction opposite to the rotation direction of the main pawl, and wherein the off-center location of the inertia pawl with respect to the rotation center of the main pawl causes the inertia pawl to move in a spatial direction when subject to the crash acceleration force such that a second end portion of the inertia pawl meets a blocking element that prevents a further spatial movement of the inertia pawl and thereby also prevents a further rotation of the main pawl before the main pawl has rotated into the second position to release the claw.

2. A vehicle, comprising:

a hood having a striker attached to an inside of the hood, and a hood latch system, comprising:

a claw, spring loaded by a spring and pivotally attached to an assembly base, wherein the claw is rotatable between an engaged position, in which said striker is locked in place by said claw, and an open position in which said striker is disengaged from said claw, a main pawl, spring loaded by another spring and pivotally attached to said assembly base, wherein, under the influence of a normal operation force, the main pawl is rotatable between a first position, in which the claw is held in place by said main pawl in the engaged position, and a second position, in which said claw is released by said main pawl, whereby said claw is allowed to rotate into said open position, and an inertia pawl, spring loaded by a further spring and rotatable with respect to the main pawl between a blocking position, in which the inertia pawl blocks the main pawl from rotating from said first position to said second position, and a non-blocking position, in which the main pawl is allowed to rotate from said first position to said second position, wherein, when said main pawl is caused to be activated for rotating from said first position to said second position by a crash acceleration force caused by a crash event, said main pawl is configured to prevent said striker from being released from the hood latch system, wherein said crash acceleration force is higher than said normal operation force, wherein the inertia pawl is biased to be in the non-blocking position under normal operation, wherein under the influence of said crash acceleration force the inertia pawl is configured to rotate to the blocking position, wherein said inertia pawl is pivotally attached at one end portion of the inertia pawl to said main pawl at a location off-center from a rotation center of the main pawl, wherein said inertia pawl is spring loaded by the further spring at the pivotal attachment and biased in the same rotation direction as for rotating the main pawl from the first position to the second position, wherein, when subject to the crash acceleration force which causes the main pawl to be activated to rotate from the first position to the second position, the further spring is adapted to allow the inertia pawl to rotate relative to the main pawl in a direction opposite to the rotation direction of the main pawl, and wherein the off-center location of the inertia pawl with respect to the rotation center of the main pawl causes the inertia pawl to move in a spatial direction when subject to the crash acceleration force such that a second end portion of the inertia pawl meets a blocking element that prevents a further spatial movement of the inertia pawl and thereby also prevents a further rotation of the main pawl before the main pawl has rotated into the second position to release the claw.

* * * * *